US012513835B2

(12) United States Patent
Sano et al.

(10) Patent No.: US 12,513,835 B2
(45) Date of Patent: Dec. 30, 2025

(54) ELECTRONIC DEVICES WITH EXPANDABLE DISPLAYS

(71) Applicant: Apple Inc., Cupertino, CA (US)

(72) Inventors: Tatsuya Sano, San Jose, CA (US); Michael B Wittenberg, San Francisco, CA (US); Hoon Sik Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 18/301,911

(22) Filed: Apr. 17, 2023

(65) Prior Publication Data

US 2023/0345655 A1     Oct. 26, 2023

Related U.S. Application Data

(60) Provisional application No. 63/333,457, filed on Apr. 21, 2022.

(51) Int. Cl.
 *H05K 5/02*     (2006.01)
(52) U.S. Cl.
 CPC .................................. *H05K 5/0217* (2013.01)
(58) Field of Classification Search
 CPC ... H05K 5/0217; G06F 1/1616; G06F 1/1624; G06F 1/1652; G06F 1/1681; H04M 1/0237; H04M 1/0268
 See application file for complete search history.

(56) References Cited

U.S. PATENT DOCUMENTS

| 10,194,543 B2 | 1/2019 | Seo et al. |
| 10,938,970 B1 * | 3/2021 | Lee ..................... H04M 1/0268 |
| 11,016,532 B2 | 5/2021 | Yang |
| 11,343,361 B2 | 5/2022 | He et al. |
| 11,545,054 B2 | 1/2023 | Lee et al. |
| 11,602,062 B2 | 3/2023 | Wittenberg et al. |
| 11,974,406 B2 * | 4/2024 | Lee ..................... G06F 1/1637 |
| 2015/0077917 A1 * | 3/2015 | Song ..................... G06F 1/1652 |
| | | 361/679.27 |
| 2015/0325804 A1 * | 11/2015 | Lindblad ................ H10K 59/40 |
| | | 313/511 |
| 2018/0103550 A1 | 4/2018 | Seo et al. |

(Continued)

FOREIGN PATENT DOCUMENTS

EP          3964923 A1     3/2022

*Primary Examiner* — Sagar Shrestha
(74) *Attorney, Agent, or Firm* — Treyz Law Group, P.C.; Kendall P. Woodruff

(57) ABSTRACT

An electronic device may have a housing, an expandable display mounted to the housing, and a frame for supporting the expandable display. The housing, display, and frame may be operable in expanded and retracted states. In the retracted state, an exposed portion of the display is viewable on the outside of the device, while a retractable portion of the display is enclosed within the housing and hidden behind the exposed portion of the display. As the device transitions from the retracted state to the expanded state, the retractable portion of the display may roll around an axis onto the front of the device to increase the size of the viewable display area. The frame may have a rigid portion that is mostly solid metal supporting the exposed portion of the display and a flexible portion formed from parallel strips of metal supporting the retractable portion of the display.

21 Claims, 13 Drawing Sheets

(56) References Cited

U.S. PATENT DOCUMENTS

| | | | |
|---|---|---|---|
| 2020/0253069 A1* | 8/2020 | Cha | G06F 1/1616 |
| 2022/0078270 A1* | 3/2022 | Song | H04M 1/0235 |
| 2022/0091636 A1* | 3/2022 | Cho | H02K 7/116 |
| 2022/0155823 A1* | 5/2022 | Shin | G09F 9/301 |
| 2022/0183173 A1* | 6/2022 | Kim | H05K 5/0217 |
| 2022/0232716 A1* | 7/2022 | Lim | H10K 77/00 |
| 2022/0253103 A1* | 8/2022 | Choi | G06F 1/1624 |
| 2022/0263932 A1* | 8/2022 | Jo | G06F 1/1652 |
| 2023/0199980 A1* | 6/2023 | Jiang | G06F 1/1652 |
| | | | 361/807 |
| 2023/0315145 A1* | 10/2023 | Lee | H04M 1/0268 |
| | | | 361/679.01 |

* cited by examiner

ELECTRONIC DEVICES WITH EXPANDABLE DISPLAYS

This application claims the benefit of provisional patent application No. 63/333,457, filed Apr. 21, 2022, which is hereby incorporated by reference herein in its entirety.

FIELD

This relates generally to electronic devices, and, more particularly, to electronic devices with displays.

BACKGROUND

Electronic devices often have displays. Portability may be a concern for some devices, which tends to limit available real estate for displays.

SUMMARY

An electronic device may include a housing and an expandable display coupled to the housing. The housing and display may be operable in expanded and retracted states. The expandable display may have an exposed portion that remains exposed on the outer surface of the device and a retractable portion that rolls between a retracted position that is hidden behind the exposed portion and a viewable position that is coplanar with the exposed portion.

The display may be mounted to and supported by a frame. In the retracted state, a retractable portion of the display and frame are enclosed within the housing and hidden behind an exposed portion of the display. As the device transitions from the retracted state to the expanded state, the retractable portion of the display and frame may roll around an axis onto the front of the device to increase the size of the viewable display area. As the device transitions from the expanded state to the retracted state, the retractable portion of the display and frame may roll back around the axis to the retracted position within the housing.

The frame may have a rigid portion that is mostly solid metal supporting the exposed portion of the display and a flexible portion formed from parallel strips of metal supporting the retractable portion of the display. The parallel strips of metal may roll around an axis and may slide along guide rails as the display transitions between expanded and retracted states.

One or more tensioning structures may be coupled to one of the strips of metal and may apply tension to the display. The tensioning structures may include first and second tensioning bars that rotate about an axis during expansion and retraction.

A slider mechanism may include first and second rack-and-gear mechanisms coupled by a common drive shaft to ensure that top and bottom edges of the display are moved in unison during expansion and retraction. Each rack-and-gear mechanism may include upper and lower racks and upper and lower gears to ensure that upper and lower housing portions do not swing away from one another during expansion and retraction.

DETAILED DESCRIPTION

Electronic devices may be provided with displays. Displays may be used for displaying images for users. Displays may be formed from arrays of light-emitting diode pixels or other pixels. For example, a device may have an organic light-emitting diode display or a display formed from an array of micro-light-emitting diodes (e.g., light-emitting diodes formed from crystalline semiconductor dies).

Figure 1:
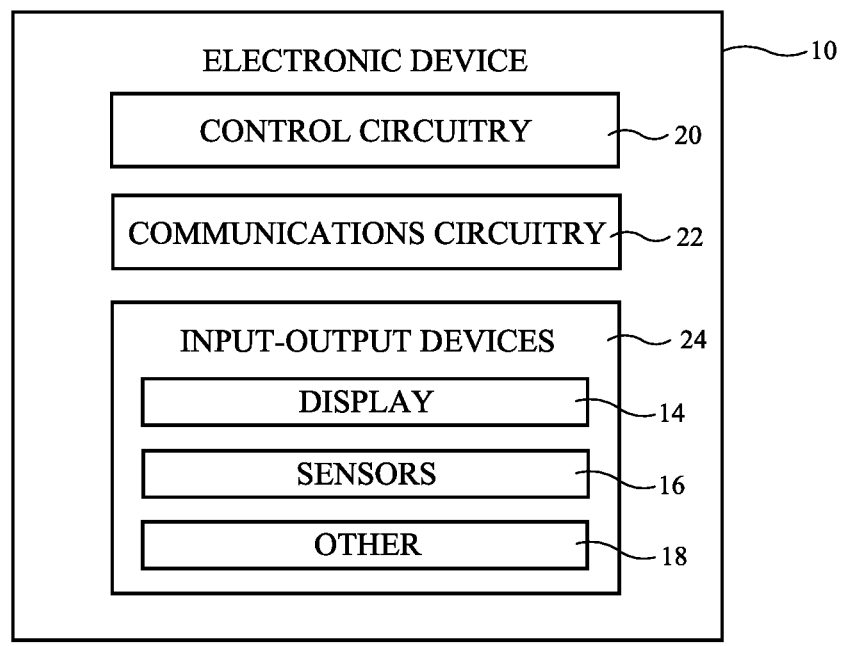
FIG. 1 is a schematic diagram of an illustrative electronic device in accordance with an embodiment.

A schematic diagram of an illustrative electronic device having a display is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment. Configurations in which device 10 is a cellular telephone, tablet computer, or other portable electronic device may sometimes be described herein as an example. This is illustrative. Device 10 may, in general, be any suitable electronic device with a display.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry (wireless transceiver circuitry), and other wireless communications circuitry and/or wired communications circuitry. Circuitry 22, which may sometimes be referred to as control circuitry and/or control and communications circuitry, may support bidirectional wireless communications between device 10 and external equipment over wired and/or wireless links (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 6 GHz and 300 GHz, a 60 GHz link, or other millimeter wave link, cellular telephone link, wireless local area network link, personal area network communications link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display or microLED display are sometimes described herein as an example.

Display 14 may have an array of pixels configured to display images for a user. The pixels may be formed as part of a display panel that is bendable. This allows device 10 to be bent about a bend axis. For example, a flexible (bendable) display in device 10 may be partly or completely rolled up so that device 10 may be placed in a compact shape for storage and may be rolled out when it is desired to view images on the display. Displays with bendable portions may sometimes be referred to herein as rollable displays, scrollable displays, expandable displays, retractable displays, flexible displays, or bendable displays. A rollable display may be completely rollable (e.g., flexible over its entire area) or may be partly rollable (e.g., one or more edge portions of a display may be provided with sufficient flexibility to be rolled whereas one or more other portions of the display may be less flexible and/or may be fixed in a planar state). Display 14 may have one or more retractable portions. When the retractable portion of display 14 is retracted within the housing, the exposed active area of display 14 where images are displayed may span across a first surface area. When the retractable portion of display 14 is deployed (e.g., exposed on the outer surface of the housing rather than enclosed within the housing), the exposed active area of display 14 where images are displayed may span across a second surface area that is larger than the first surface area. If desired, control circuitry 20 may automatically adjust images on display 14 based on how much surface area of display 14 is viewable on the outside of device 10. This may include, for example, adjusting the layout of images, the size of images, the position of images, whether images are displayed in landscape orientation or portrait orientation, etc.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
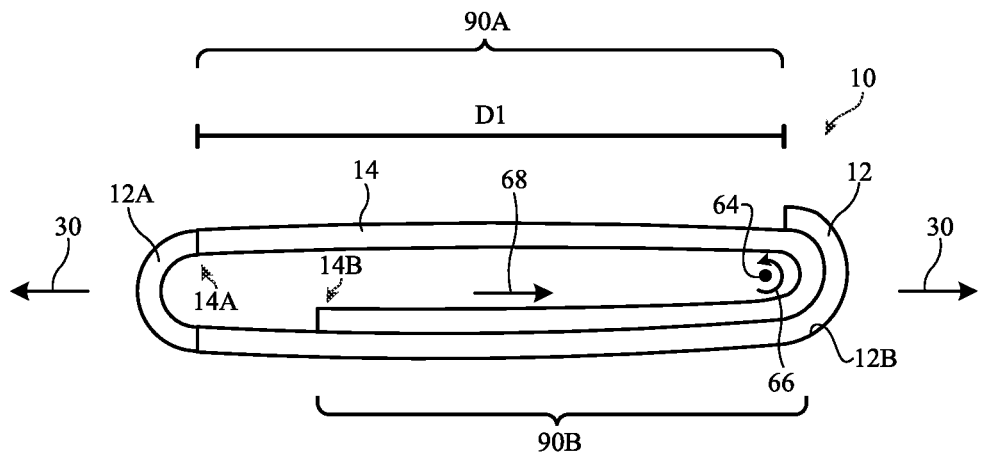
FIG. 2 is a cross-sectional side view of an illustrative electronic device with an expandable display in a retracted state in accordance with an embodiment.

FIG. 2 is a cross-sectional side view of an illustrative electronic device with an expandable display in a retracted state. As shown in FIG. 2, device 10 may include display 14 mounted to housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may have an exposed portion such as exposed portion 90A and a retractable portion such as retractable portion 90B. Exposed portion 90A may face a user of the electronic device during use and may sometimes be referred to as an exposed active area or outwardly facing portion of display 14. Retractable portion 90B may be enclosed within housing 12 and may face away from the user. The outline of exposed portion 90A of display 14 when viewed by the user may be rectangular or may have other suitable shapes.

Display 14 may have a pixel array such as an array of light-emitting pixels (e.g., a rectangular array of light-emitting diodes). During operation, the pixel array of display 14 may produce images that pass through a transparent protective layer and that are viewable by the user on the front of device 10. The protective layer may include clear polymer, clear glass, and/or other transparent structures that allow images to be viewed while providing support (e.g., rigidity) and protection (e.g., protection from scratches and other damage) for display 14. As an example, a layer of glass that is attached to the outer (front-facing) surface of display 14 may be used to prevent display 14 from deforming and becoming damaged when a user's finger, computer stylus, or other external object contacts the front side of device 10. Protective polymer layers and/or other protective layers may be formed as coatings on the glass layer help prevent scratching of the glass layer. The substrate used in forming display 14 may be flexible (e.g., display 14 may have a pixel array formed on a flexible polymer substrate or other flexible substrate). A protective display cover layer may also be formed from flexible structures. As a result, some or all of the area of display 14 may be flexible, which allows some or all of display 14 to retracted, rolled up, or otherwise stowed away.

As shown in FIG. 2, display 14 has a U-shape when device 10 is in the compact or retracted state, with exposed portion 90A and retractable portion 90B of display 14 substantially parallel and overlapping with one another When device 10 is in the compact state of FIG. 2, retractable portion 90B of display 14 may include a curved portion that curves around axis 64 (sometimes referred to as roll axis 64). In the closed or retracted state shown in FIG. 2, device 10 and display 14 have more compact dimensions, with exposed portion 90A spanning dimension D1. During operation by a user, the pixels on exposed portion 90A may be used to display images across dimension D1. The pixels on retractable portion 90B may be inactive or may be active (e.g., in arrangements where housing 12 includes a transparent portion on the rear face of device 10). The compact shape of device 10 when display 14 is in the retracted state may be convenient for a user in several different scenarios, such as when a user is transporting device 10, fitting device 10 in a pocket or bag, or otherwise using device 10 in situations where a smaller device is desired.

If desired, housing 12 may also have retractable structures that allow housing 12 to expand and retract. For example, housing 12 may have portions that are movable relative to one another such as housing portion 12A and housing portion 12B. Housing portion 12A may form a first sidewall of device 10 and housing portion 12B may form a second opposing sidewall of device 10. In the closed or retracted state of FIG. 2, the sidewalls formed by housing portions 12A and 12B may be separated by distance D1. When it is desired to expand display 14 and operate device 10 with a larger form factor, housing portions 12A and 12B may be moved away from one another in directions 30.

Figure 3:
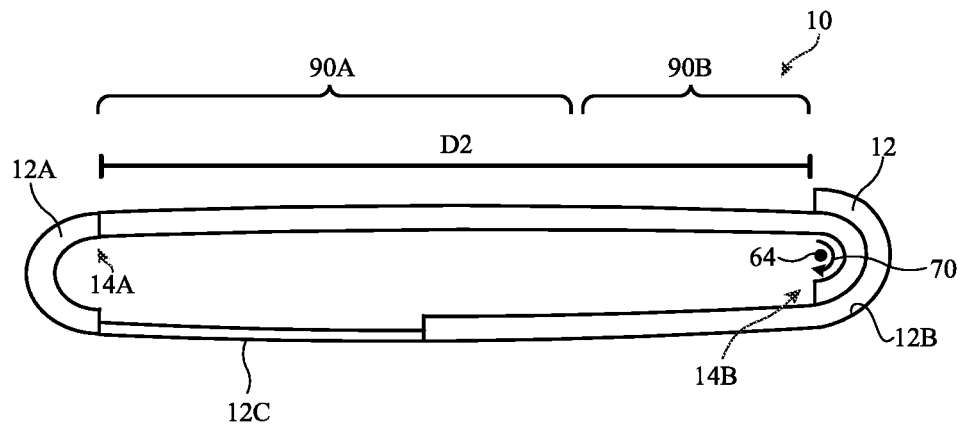
FIG. 3 is a cross-sectional side view of an illustrative electronic device with an expandable display in an expanded state in accordance with an embodiment.

As shown in FIG. 2, display 14 has first and second opposing ends such as first end 14A and second opposing end 14B. First end 14A may form part of exposed portion 90A of display 14 and may always be exposed on the outside of device 10. First end 14A of display 14 may be fixed to portion 12A of housing 12, whereas second end 14B of display 14 may be movable relative to housing 12B. As such, when housing portions 12A and 12B are moved apart in directions 30, housing portion 12A pulls on end 14A, causing end 14B to move relative to housing 12B in direction 68 and to roll around axis 64 in direction 66 until end 14B is exposed on the outside of device 10, as shown in FIG. 3. During opening (e.g., expanding), exposed portion 90A of display 14 may remain flat and exposed on the outside of device 10 while retractable portion 90B of display 14 rolls in direction 66 around roll axis 64.

As housing portions 12A and 12B are pulled apart in directions 30, a retracted portion of housing 12 such as retracted portion 12C of FIG. 3 may be pulled out of housing 12 (e.g., may be pulled out of housing portion 12B) as the distance between the opposing sidewalls formed by housing portions 12A and 12B is expanded to distance D2 of FIG. 3 (a distance greater than D1). In the expanded or open state of FIG. 3, the entirety of display 14 (e.g., exposed portion 90A and retractable portion 90B) is exposed on the outside, with end 14A of display 14 meeting the first sidewall formed by housing portion 12A and end 14B of display 14 meeting the opposing second sidewall formed by housing portion 12B. In the expanded state of FIG. 3, display 14 may be planar (e.g., exposed portion 90A and retractable portion 90B may lie in a common plane) or may have some curvature. As all of display 14 is exposed on the outside of device 10 in the expanded state of FIG. 3, all of the pixels of display 14 may be used to display images across dimension D2. This increases the amount of display surface area that is viewable to the user, without requiring the user to fold or unfold device 10. During closing (e.g., retracting), exposed portion 90A of display 14 may remain flat and exposed on the outside of device 10 while retractable portion 90B of display 14 rolls back in direction 70 around axis 64 to the retracted position behind exposed portion 90A.

Device 10 and display 14 may be expandable along a single dimension (e.g., along a width direction, a length direction, a side-to-side direction, a top-to-bottom direction, etc.) or may be expandable along multiple dimensions (e.g., a side-to-side direction and a top-to-bottom direction). Arrangements in which device 10 is expandable along a width or side-to-side direction are sometimes described herein as an example. If desired, the size of the viewable area of display 14 may be continuously adjustable (e.g., to any desirable position between the fully expanded state and the fully retracted state) or may be adjustable between fixed, discrete positions (e.g., display 14 may only be adjusted between the fully expanded state and the fully retracted state, or may be adjusted to one or more fixed positions between the fully expanded state and the fully retracted state). The expansion (e.g., opening) and retraction (e.g., closing) of device 10 may be done manually by a user (e.g., by a user manually pulling housing portions 12A and 12B apart or pushing housing portions 12A and 12B back together) and/or may be an automated slider mechanism involving motors, electromechanical actuators, electromagnetic actuators (e.g., solenoids), piezoelectric actuators, and/or other actuators. For example, device 10 may include a slider mechanism with one or more motors and one or more rack-and-gear mechanisms that are configured to slide housing 12 and display 14 between expanded and retracted states (e.g., by moving housing portions 12A and 12B away from and towards each other). This type of rack-and-gear-based slider mechanism is described in greater detail in connection with FIGS. 12 and 13.

Figure 4:
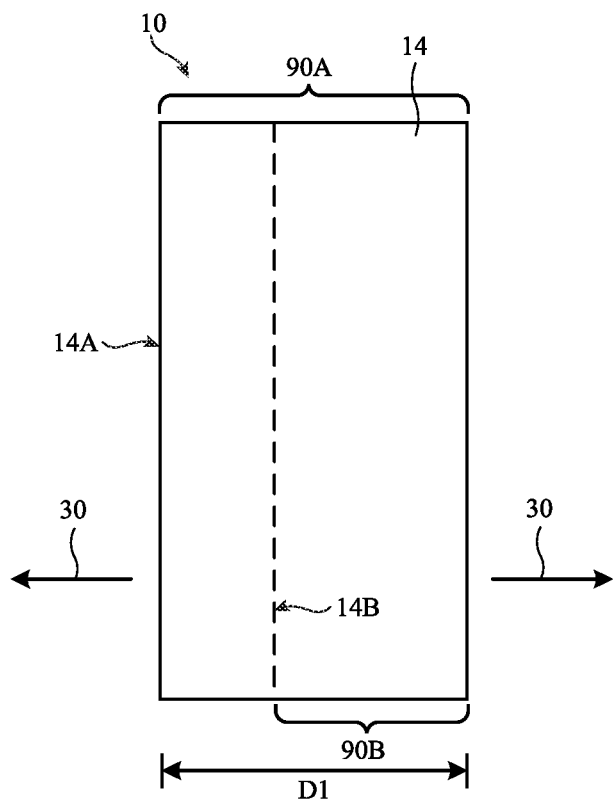
FIG. 4 is a top view of an illustrative electronic device with an expandable display in a retracted state in accordance with an embodiment.
Figure 5:
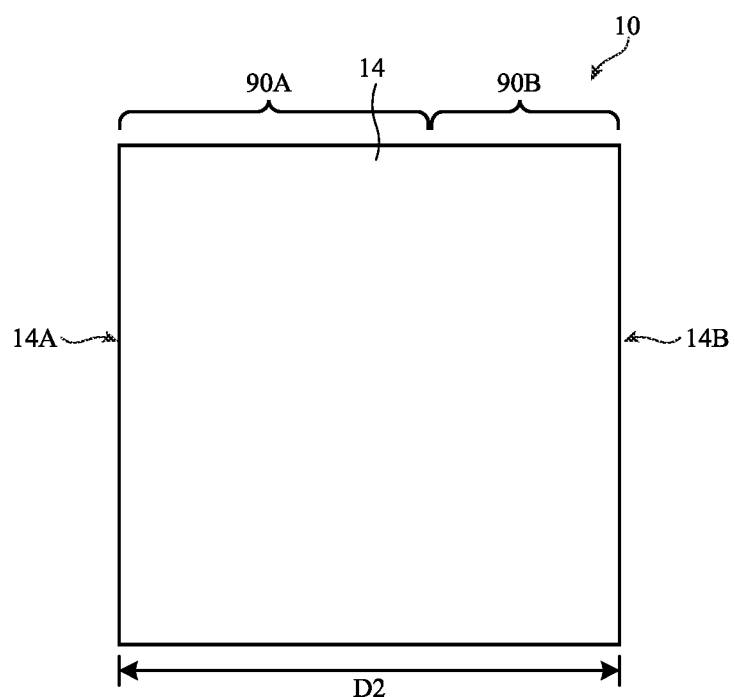
FIG. 5 is a top view of an illustrative electronic device with an expandable display in an expanded state in accordance with an embodiment.

FIGS. 4 and 5 are top views of an illustrative device 10 of the type shown in FIGS. 2 and 3, showing how display 14 and device 10 may operate in a retracted state (FIG. 4) and an expanded state (FIG. 5). As shown in FIG. 4, the viewable portion of display 14 (formed by exposed portion 90A of display 14) may have a first width D1 when display 14 is in the retracted state. End 14A of display 14 may be exposed on the outside of device 10, while retractable portion 90B and opposing end 14B of display 14 are retracted within the housing and are hidden from view by the user. Retractable portion 90B is stored behind exposed portion 90A, parallel and overlapping so that device 10 need not be excessively thick (if desired).

When the sidewalls of device 10 are moved apart in directions 30 (e.g., by a user and/or by an internal sliding mechanism within device 10), end 14A of display 14 may pull opposing end 14B of display 14 onto the front of device 10, as shown in FIG. 5. The viewable portion of display 14 (formed by exposed portion 90A and retractable portion 90B of display 14) may have a second width D2 when display 14 is in the expanded state. This increases the viewable surface area of display 14 (e.g., by 100%, 90%, 80%, 50%, 30%, less than 30%, more than 15%, more than 100%, and/or any other suitable amount). In the expanded state of FIG. 5, both ends 14A and 14B are exposed on the front face of device 10.

Care must be taken to ensure that display 14 can expand and retract smoothly without creating bulges, waviness, or wiggling in the display. Additionally, the backside of display 14 should be sufficiently supported in both the expanded state and the retracted state. To provide sufficient support to the backside of display 14 and to mitigate display bulging due to display stiffness, device 10 may include a display frame with solid and/or rigid portions for supporting the exposed portion of display 14 and segmented and/or flexible portions for supporting the retractable portion of display 14. This type of arrangement is illustrated in FIG. 6.

Figure 6:
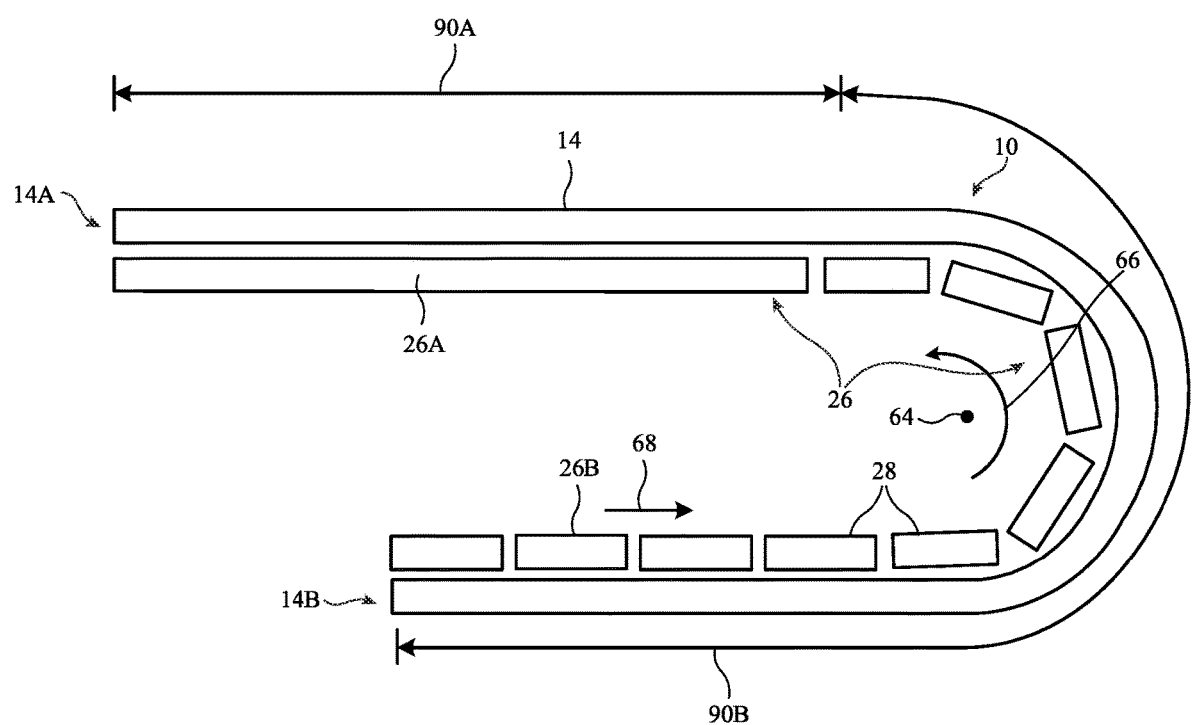
FIG. 6 is a cross-sectional side view of an illustrative electronic device having an expandable display mounted to a frame with a rigid portion and a segmented portion in accordance with an embodiment.

As shown in FIG. 6, display 14 may be supported by a frame such as display frame 26. Display frame 26 may be formed of metal (e.g., stainless steel, aluminum, etc.), plastic, glass, ceramics, fiber composites, other suitable materials, or a combination of any two or more of these materials. Display frame 26 may have a first portion such as first portion 26A supporting exposed portion 90A of display 14 and a second portion such as second portion 26B supporting retractable portion 90B of display 14. An adhesive layer or other attachment mechanism (e.g., screws, welds, clips, etc.) may be used to attach display 14 to frame 26. Display 14 may, for example, include a backside metal layer (sometimes referred to as a metal backplate) or other support layer, and frame 26 may be coupled to the backside metal layer of display 14.

Portion 26A of frame 26 may be thicker, more rigid, and/or more solid than portion 26B of frame 26, since portion 26A does not need to bend or roll like portion 26B does during expansion and retraction. Portion 26B of frame 26 may be thinner, more flexible, and/or segmented to allow for smooth rolling around roll axis 64. For example, as shown in FIG. 6, frame portion 26B may be formed from multiple smaller frame structures such as frame segments 28. Frame segments 28 may be strips of metal, plastic, or other material. Frame segments 28 may be rectangular or may have other suitable shapes. Frame segments 28 may be movable relative to one another to allow frame portion 26B to bend about axis 64. In the retracted state of FIG. 6, frame portion 26B has a flat portion that is behind and mostly parallel to frame portion 26A and has a curved portion that curves around axis 64 and is coupled to frame portion 26A. As device 10 is expanded and end 14B of display 14 is pulled out from behind exposed portion 90A and onto the front face of device 10, frame segments 28 may also be pulled out from behind exposed portion 90A and may roll around axis 64 in direction 66 onto the front face of housing 12. When device 10 is fully expanded, all of frame 26 may be on the front face of device 10, with portion 26A supporting exposed portion 90A of display 14 and portion 26B supporting retractable portion 90B of display 14. Portions 26A and 26B of frame 26 may be coplanar when device 10 is in the expanded state.

Figure 7:
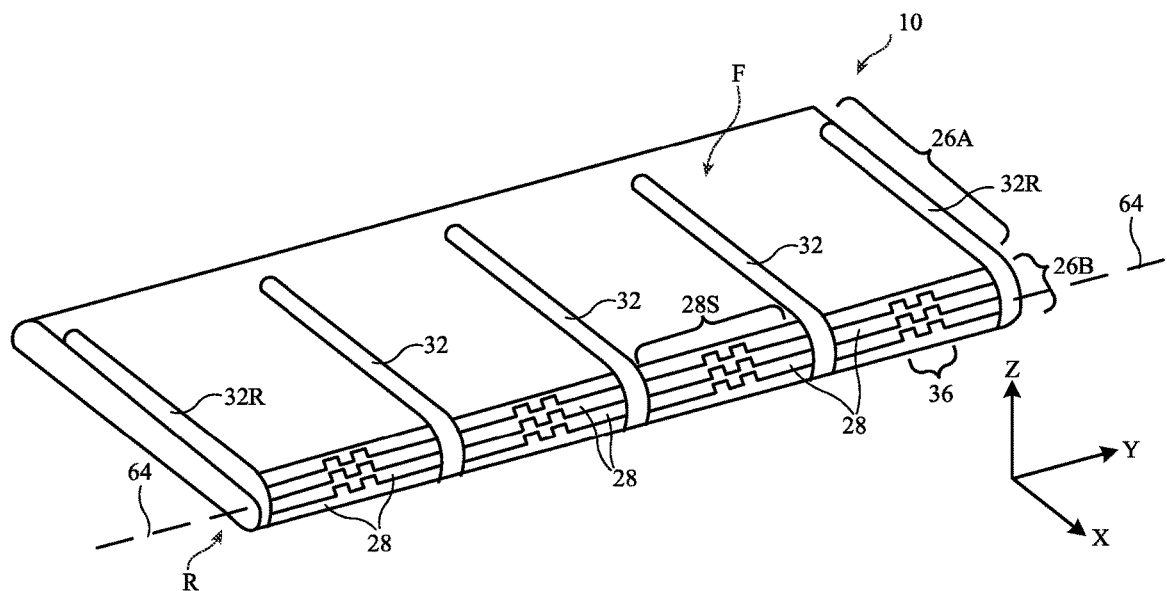
FIG. 7 is a front perspective view of an illustrative electronic device with a display frame in a retracted state in accordance with an embodiment.
Figure 8:
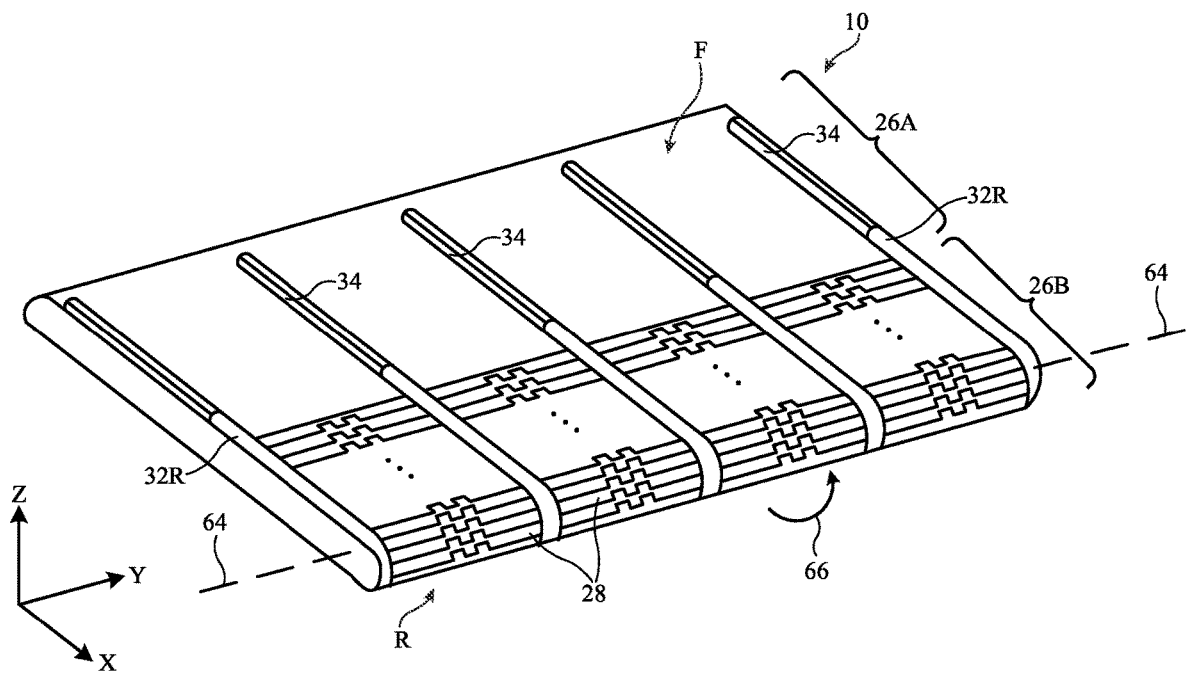
FIG. 8 is a front perspective view of an illustrative electronic device with a display frame in an expanded state in accordance with an embodiment.

FIGS. 7 and 8 are front perspective views of device 10 showing how display frame 26 may shift between retracted and expanded states along with the display and housing of device 10. In the retracted state of FIG. 7, frame portion 26A is located on the front face F of device 10 and is configured to support exposed portion 90A of display 14 (not shown in FIG. 7). Frame portion 26B has a first end coupled to frame portion 26A on the front face F of device 10 and a second opposing end on the rear face R of device 10 coupled to end 14B of display 14.

Frame segments 28 may be a series of parallel strips each extending parallel to roll axis 64 (e.g., parallel to the y-axis of FIG. 7). Frame segments 28 may extend continuously between top and bottom edges of display 14 or may be further segmented along their lengths. As shown in FIG. 7, for example, each frame segment 28 may have multiple length-wise segments 28S extending along the length of the frame segment 28 and coupled between guide rails such as guide rails 32. Each length-wise segment 28S may have first and second opposing ends that mate with respective guide rails 32. Guide rails 32 may have frame guiding features such as slots, ledges, recesses, channels, and/or other mating features that mate with corresponding features on segments 28S and help constrain movement of display 14 in the z-direction. During opening and closing, segments 28S may slide along and relative to guide rails 32 in a direction perpendicular to roll axis 64 (e.g., parallel to the x-axis of FIG. 7). If desired, some of guide rails 32 such as top and bottom edge guide rails 32R may be aligned with rack-and-gear mechanisms that drive the opening and closing of housing 12 during expansion and retraction of display 14.

Frame segments 28 may be movably coupled to one another using mating engagement features such as engagement features 36. Engagement features 36 may be mating (e.g., interlocking) recesses and protrusions, hinge structures, and/or other attachment structures for attaching adjacent frame segments 28 while allowing movement (e.g., rotation) of each segment 28 relative to adjacent segments. Interlocking engagement features 36 may allow frame portion 26B to roll around roll axis 64 during opening and closing of device 10. When frame segments 28 are aligned with one another in the same plane (e.g., when frame segments 28 are located on front face F when device 10 is in the expanded or expanding state), interlocking engagement features 36 may form a solid rigid surface.

During the expansion of device 10 illustrated in FIG. 8, frame segments 28 may be pulled out from rear face R and onto front face F of device 10, rolling around axis 64 in direction 66 as the viewable portion of display 14 expands (e.g., as retractable portion 90B of display 14 rolls onto the front of device 10 to expand the viewable display area). As device 10 expands, guide rails 32 may move relative to frame portion 26A. In particular, guide rails 32 may be mounted within openings such as openings 34 in frame portion 26A. As device 10 expands along the x-axis of FIG. 8, guide rails 32 may slide within openings 34 as frame portion 26A moves away from guide rails 32. Although openings 34 in frame portion 26A are exposed to the underside of display 14 when device 10 is in the expanded state, the remaining portions of frame 26A may be solid (e.g., without openings) so that display 14 remains sufficiently supported in the expanded state of FIG. 8. For example, frame 26A may be formed from solid metal without openings in the regions between guide rail openings 34.

In addition to providing support for display 14, frame 26 may have features that constrain movement of display 14 in the z-direction to help prevent display bulging or floating during expansion and retraction. Illustrative z-constraint features that may be included in display frame 26 are shown in FIG. 9.

Figure 9:
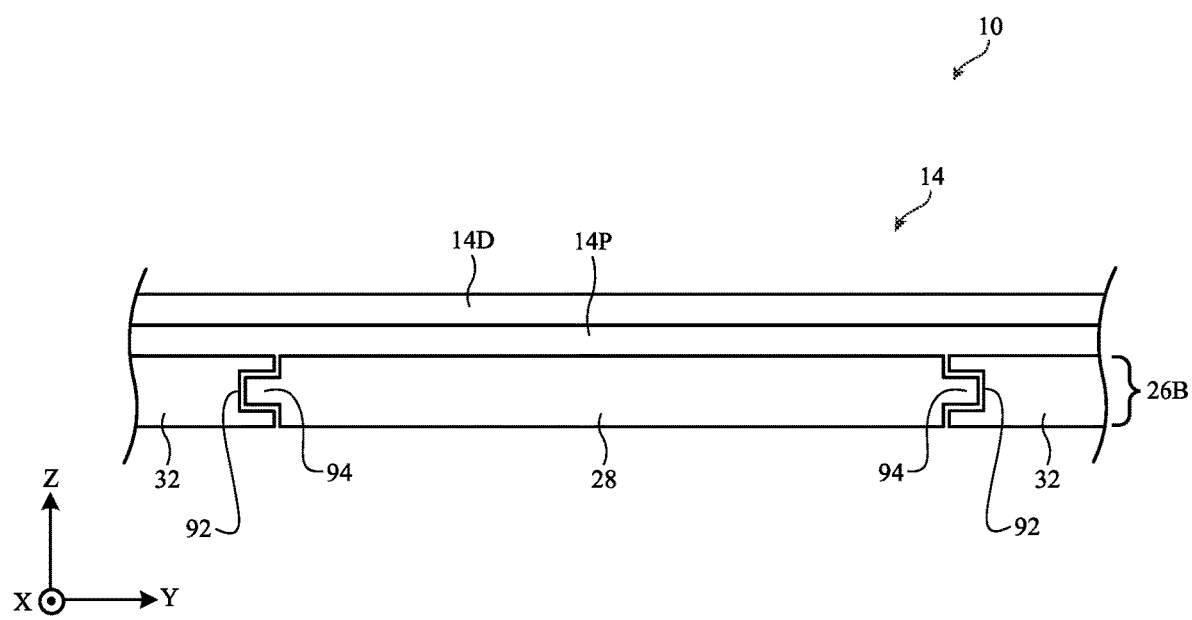
FIG. 9 is a cross-sectional side view of an illustrative electronic device with a display frame having z-constraint features to help prevent display bulging during expansion and retraction in accordance with an embodiment.

As shown in FIG. 9, display 14 may include a display layer such as display layer 14D having an array of pixels for displaying images. Display layer 14D may be laminated to a backplate such as metal backplate 14P. Backplate 14P may be connected to frame segments 28 (e.g., via screws, adhesives, welds, other suitable attachment structures, etc.). Display 14 (e.g., displayer layer 14D and backplate 14P) and frame segments 28 may be configured to slide in the x-direction relative to rails 32. If care is not taken, the stiffness of display 14 may cause display 14 to lift up and bulge outwardly. To help prevent display 14 from floating outwardly (e.g., away from rails 32 in the z-direction of FIG. 9), rails 32 and frame segments 28 may have mating engagement features that help constrain movement of frame segments 28 in the z-direction. For example, rails 32 may have z-constraint features 92 (e.g., recesses, grooves, trenches, etc.) and frame segments 28 may have mating z-constraint features 94 (e.g., protrusions, ribs, etc.). Features 92 on rails 32 may include upper and lower lips that overlap features 94 on frame segments 28. This helps constrain movement of frame segments 28 in the z-direction while allowing frame segments 28 to slide within and relative to rails 32 (e.g., along the x-axis of FIG. 9) during expansion and retraction. Because display 14 is attached to frame segments 28, the z-constraint features of frame segments 28 and rails 32 may help prevent display 14 from floating outwardly away from rails 32 during expansion and retraction.

To prevent bucking of display 14 during expansion and retraction, one end of display 14 such as end 14B may be tensioned using a tensioning member, while the opposing end of display 14 such as end 14A may be attached to housing 12 using a rigid attachment mechanism (as an example). As device 10 expands and retracts, the tensioning member may move to accommodate movement of display 14 while maintaining tension on the display. If desired, only one end of display 14 may be tensioned with a tensioning member or both ends of display 14 may be tensioned with respective tensioning members. The tensioning members may be formed from rotating bars, metal or polymer springs, springs formed from planar elastomeric members that stretch, or other materials that can be used to tension display 14. An arrangement in which display 14 has been tensioned with one or more tensioning structures is shown in FIGS. 10 and 11.

Figure 10:
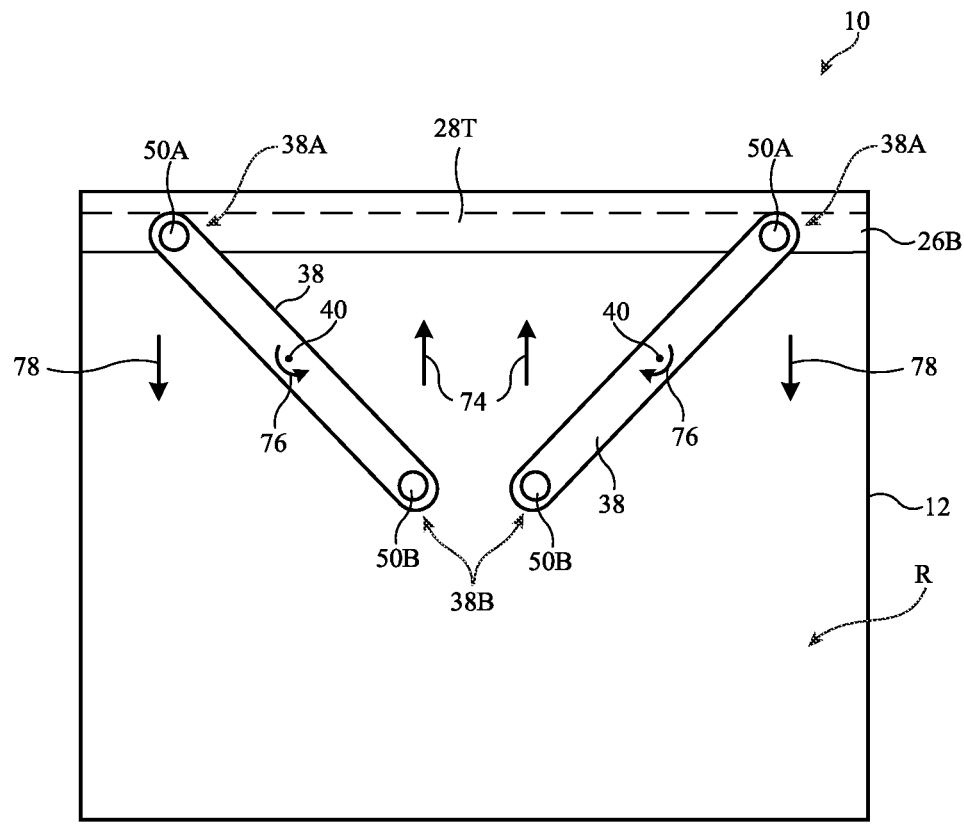
FIG. 10 is a rear view of an illustrative electronic device in an expanded state with tensioning structures for tensioning an expandable display in accordance with an embodiment.
Figure 11:
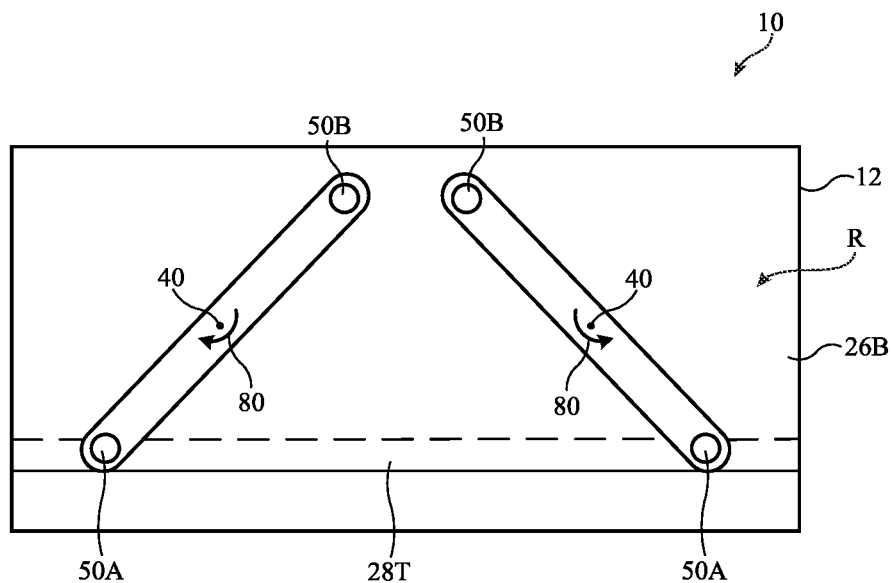
FIG. 11 is a rear view of an illustrative electronic device in a retracted state with tensioning structures for tensioning an expandable display in accordance with an embodiment.

In the examples of FIGS. 10 and 11, one or more tensioning structures such as first and second tensioning bars 38 may be coupled between frame 26 and housing 12. Since display 14 is mounted to frame 26, applying tension to frame 26 using structure 38 may also apply tension to display 14. Each tensioning bar 38 may have first and second opposing ends. A first end 38A of tensioning bar 38 may be coupled to frame 26 using a first attachment mechanism such as attachment mechanism 50A, whereas a second opposing end 38B of tensioning bar 38 may be coupled to housing 12 using a second attachment mechanism such as attachment mechanism 50B. Attachment mechanisms 50A and 50B may be screws, rotating shafts, rods, pins, and/or other structures. In one illustrative arrangement, tensioning bars 38 include slots and attachment mechanisms 50A and 50B include pins that each slide within a respective one of the slots during expansion and retraction of display 14.

Segmented frame portion 26B may have first and second opposing ends, with one segment 28 at the first end coupled to frame portion 26A and another segment at the second end forming an end segment such as end segment 28T (sometimes referred to as terminal segment 28T). Terminal segment 28T may be coupled to end 14B of display 14. As such, first end 38A of tensioning bar 38 may be coupled to end segment 28T of segmented frame 26B in order to apply tension to end 14B of display 14. Second end 38B of tensioning bar 38 may be coupled to housing 12.

As device 10 moves from the expanded state of FIG. 10 to the retracted state of FIG. 11, tensioning bars 38 may rotate about respective axes 40 in directions 76, causing end 38A to pull terminal frame segment 28T in directions 78 while end 38B remains fixed to housing 12. Axes 40 may be perpendicular to roll axis 64. The tension applied by bars 38 on terminal frame segment 28T helps prevent display buckling and/or display waviness during display retraction. As device 10 moves from the retracted state of FIG. 11 to the expanded state of FIG. 10, tensioning bars 38 may rotate about respective axes 40 in directions 80, allowing end 38A to move with frame segment 28T while end 38B remains fixed to housing 12 as device 10 expands.

Figure 12:
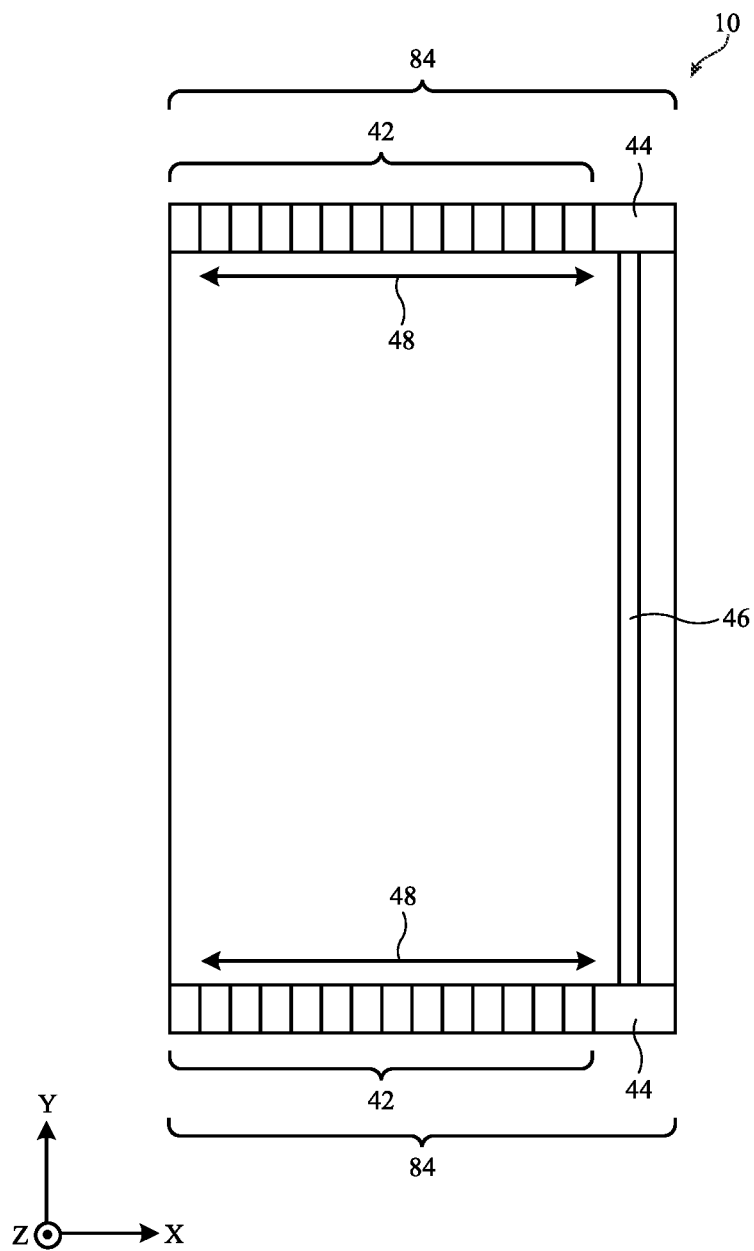
FIG. 12 is a rear view of an illustrative electronic device having rack-and-gear-based slider mechanisms coupled by a common drive shaft to ensure that top and bottom edges of the display move in unison during expansion and retraction in accordance with an embodiment.

FIG. 12 is a top view of device 10 showing how a connected drive shaft may be used to ensure smooth expansion and retraction of device 10. As shown in FIG. 12, device 10 may include one or more rack-and-gear-based slider mechanisms such as a first rack-and-gear mechanism 84 driving a first edge of housing 12 (and thus display 14 and frame 26) along directions 48 and a second rack-and-gear mechanism 84 driving a second edge of housing 12 (and thus display 14 and frame 26) along directions 48. Each rack-and-gear mechanism 84 may include one or more racks 42 and one or more gears 44. Gears 44 may have teeth that mate with corresponding teeth in racks 42. Rack-and-gear mechanisms 84 may be coupled to housing portion 12A and/or housing portion 12B (FIG. 2). For example, rack-and-gear mechanism 84 may be coupled to housing portion 12B and may be used to slide housing portion 12B relative to housing portion 12A during expansion and retraction of device 10. As housing portions 12A and 12B are pushed apart by rack-and-gear-based slider mechanisms 84, the viewable portion of display 14 may expand as retractable portion 90B slides relative to housing portion 12B onto the front of device 10. As housing portions 12A and 12B are pushed towards one another by rack-and-gear mechanisms 84, the viewable portion of display 14 may shrink as retractable portion 90B slides relative to housing portion 12B back behind exposed display portion 90A.

To ensure that the top and bottom edges of display 14 move together along directions 48 (e.g., without any wiggle in the x-y plane of FIG. 12), the top and bottom rack-and-gear mechanisms 84 may be coupled together using a common drive shaft such as drive shaft 46. Drive shaft 46 may extend parallel to the roll axis around which display 14 rolls during expansion and retraction. Drive shaft 46 may couple the movement of one rack-and-gear mechanism 84 with the movement of the other rack-and-gear mechanism 84 so that the top and bottom edges of housing 12 (and therefore the top and bottom edges of display 14 and frame 26) move together in directions 48 in unison. Even if only one of rack-and-gear mechanisms 84 is driving the movement of display 14 and frame 26, common drive shaft 46 may ensure that both rack-and-gear mechanisms 84 move the top and bottom edges of display 14 and frame 26 at the same time.

Figure 13:
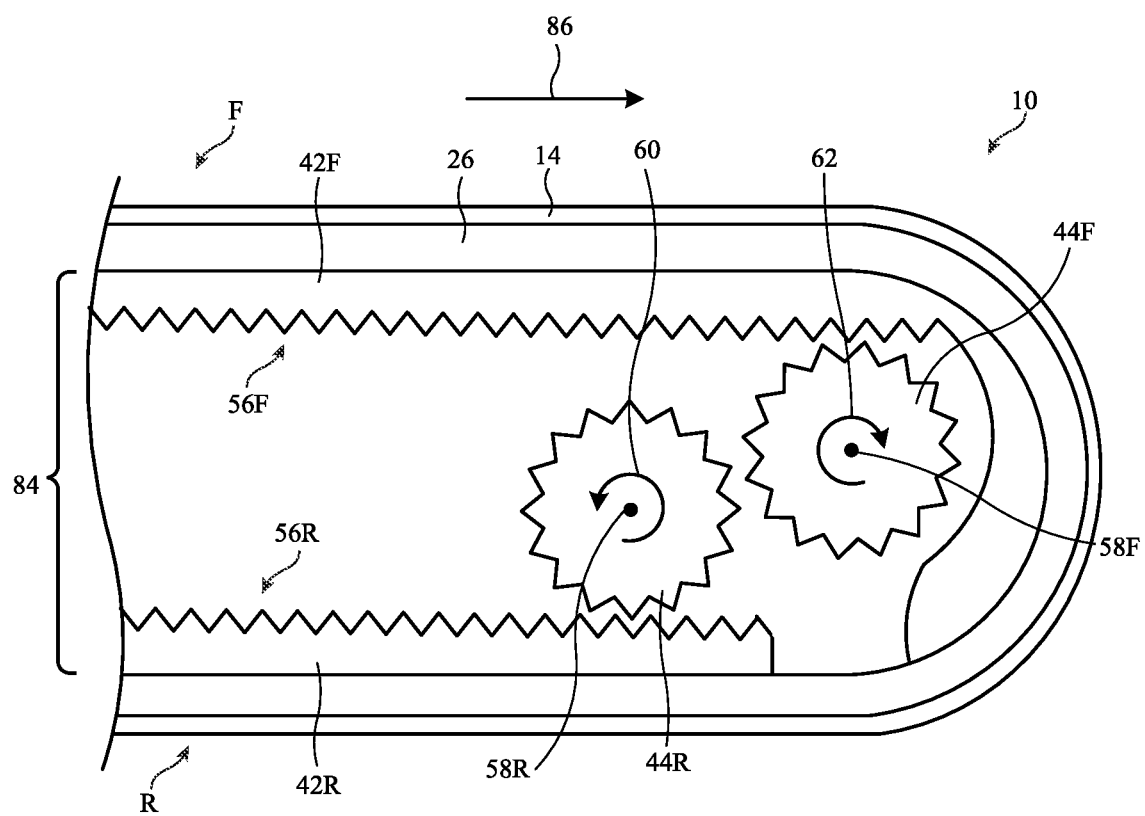
FIG. 13 is a cross-sectional side view of an illustrative rack-and-gear-based slider mechanism for mitigating vertical misalignment of the display during expansion and retraction in accordance with an embodiment.

While connected drive shaft 46 may be used to prevent wiggle in the x-y plane of FIG. 12, care should be taken to prevent wiggle in the z-direction of FIG. 12 as well during expansion and retraction of device 10. FIG. 13 is a cross-sectional side view of device 10 showing how rack-and-gear mechanism 84 may include upper and lower portions for preventing wiggle in the z-direction.

As shown in FIG. 13, rack-and-gear mechanism 84 may include upper rack 42F, lower rack 42R, upper gear 44F, and rear gear 44R. Upper gear 44F may have teeth that engage with teeth 56F of upper rack 42F. Upper rack 42F may be coupled to an upper portion of housing 12 (e.g., a portion of housing 12B on front face F and/or an internal support structure). Lower gear 44R may have teeth that engage with teeth 56R of lower rack 42R. Lower rack 42R may be coupled to a lower portion of housing 12 (e.g., a portion of housing 12B on rear face R and/or an internal support structure). Additionally, the teeth of upper gear 44F and lower gear 44R may engage with each other so that the movement of upper rack 42F is coupled to the movement of lower rack 42R. As upper gear 44F rotates about axis 58F in direction 62, lower gear 44R may be rotated about axis 58R in direction 60. The rotation of upper gear 44F in direction 62 causes upper rack 42F to move in direction 86 relative to gear 44F, while the rotation of lower gear 44R in direction 60 causes lower rack 42R to move in direction 86. This helps ensure that the upper and lower portions of housing 12B do not swing relative to one another during expansion and retraction of device 10.

Figure 14:
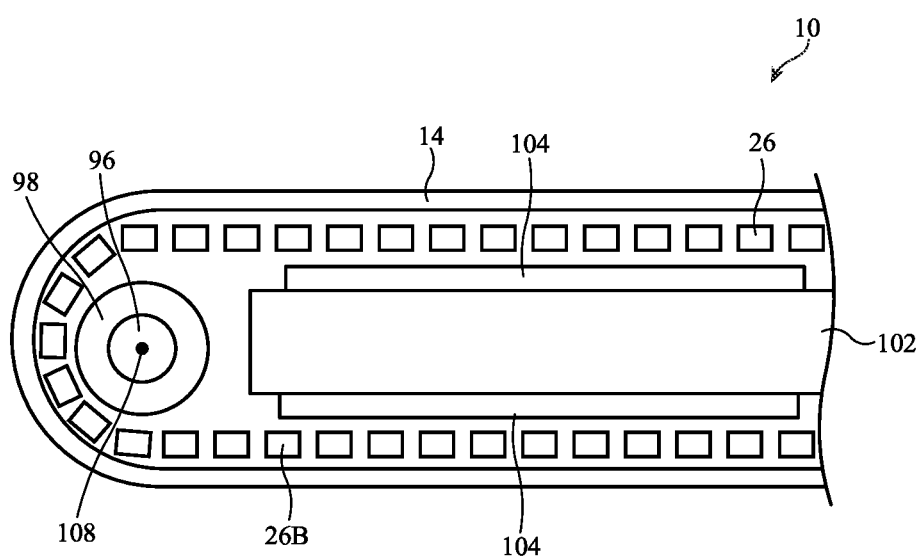
FIG. 14 is a cross-sectional side view of an illustrative display having a magnetic display frame and a magnetic roller in accordance with an embodiment.

In some arrangements, magnetic structures may be incorporated into display 14, display frame 26, and/or elsewhere in housing 12. Magnetic structures may be used to prevent display 14 from floating upwards or bulging during opening and closing. FIG. 14 is a side view of device 10 in an illustrative configuration in which magnetic structures are incorporated into device 10 to reduce display floating and bulging during expansion and retraction.

As shown in FIG. 14, expandable display 14 may be attached to a display frame such as display frame 26. Display frame 26 of FIG. 14 may be formed from magnetic materials such as steel or other suitable ferromagnetic material. The steel material of display frame 26 may be arranged in elongated, parallel metal slats (e.g., extending into and out of the page in the example of FIG. 14) to allow display frame 26 to bend and roll around roll axis 108 during expansion and retraction. Display 14 may be mounted to display frame 26 and may be configured to move with display frame 26 (e.g., to bend and roll around roll axis 108 along with display frame 26 of FIG. 14).

Display 14 and display frame 26 may bend and roll around a magnetic roller such as magnetic roller 98. Magnetic roller 98 may include magnets formed on a shaft such as shaft 96. Magnetic roller 98 may be configured to rotate about roll axis 108 of shaft 96. Magnetic materials of magnetic roller 98 may form a sheath or other outer layer on shaft 96. Magnetic roller 98 may include permanent magnets, electromagnets, or other suitable magnets. The magnetic material of magnetic roller 98 may span entirely across roller 98 or may be located in strips or segments along shaft 96. The magnetic materials of display frame 26 may be attracted to magnetic roller 98 such that display 14 and display frame 26 do not float or bulge outward during expansion or retraction of housing 12.

Additional magnets may be used on the front and back of device 10 to hold display 14 flat (e.g., in an open configuration). For example, as shown in FIG. 14, device 10 may include one or more flat magnets such as flat magnets 104 (sometimes referred to as magnetic strips 104) on the front and back of an internal support structure such as support structure 102. Magnets 104 may include permanent magnets, electromagnets, or other suitable magnets. The magnetic materials of display frame 26 may be attracted to magnets 104 such that display 14 and display frame 26 do not float or bulge outward in the expanded state, in the retracted state, during expansion, or during retraction of housing 12. When display 14 is in the retracted state of FIG. 14, magnetic strips 104 may be interposed between the exposed and retracted portions of display 14.

Figure 15:
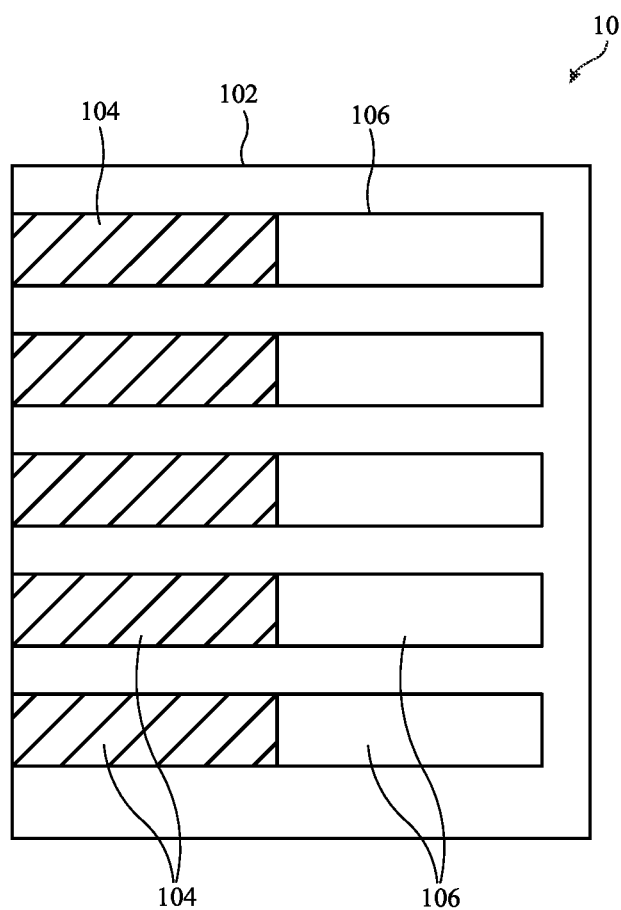
FIG. 15 is a front view of an illustrative display support structure with magnets in accordance with an embodiment.

FIG. 15 is a perspective view of device 10 showing how flat magnets 104 may include parallel strips of flat magnets that slide within grooves 106 in support structure 102. The magnetic attraction between display frame 26 of display 14 and flat magnets 104 helps hold display 14 flat (without any bulges) when display 14 is in the expanded state. As housing 12 closes, flat magnets 104 may slide within grooves 106 to accommodate retraction of display 14 while preventing display 14 from buckling or floating.

FIGS. 16, 17, 18, 19 are side views of display 14 showing how a tensioning member such as tensioning member 134 may be used to pull end 14B of display 14 taut during closing of device 10 (e.g., as housing 12 is being retracted) to avoid display buckling. Tensioning member 134 may be especially beneficial when a magnetic roller is used (e.g., magnetic roller 98 of FIG. 14), but tensioning member 134 may be used in other roller configurations as well. In general, tensioning member 134 may be used in combination with any of the previously described embodiments.

Figure 16:
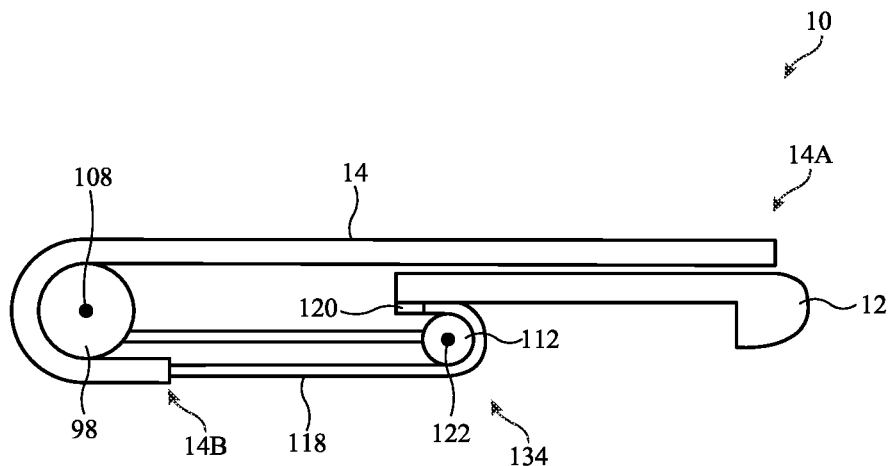
FIG. 16 is a side view of an illustrative display in an expanded state and tensioned using a tensioning member in accordance with an embodiment.

In the example of FIG. 16, display 14 is in an expanded state and tensioning member 134 may include a piece of material such as material 118. In some arrangements, material 118 may be a thin layer of fabric such as woven fabric, knitted fabric, braided fabric, and/or any other suitable type of fabric. Material 118 may be formed from interlaced strands of material such as polymer strands, nylon strands, polyester strands, Vectran strands, Kevlar strands, and/or other suitable strands of material. In other arrangements, material 118 may be a wire or cord formed from one or more strands of metal, polymer, or other suitable materials. Arrangements in which tensioning material 118 is formed from other structures or materials may also be used.

If desired, multiple strips of material 118 may be attached to end 14B of display 14. For example, first and second strips of fabric, first and second wires, and/or other suitable materials 118 may be attached to respective first and second corners of end 14B of display 14. Each material 118 may have a first end coupled to end 14B of display 14 and a second opposing end coupled to housing 12 via a rigid support structure such as rigid support structure 120. If desired, material 118 may have one or more U-shaped turns. For example, material 118 may wrap around one or more pulleys such as pulley 112 which rotates about rotational axis 122.

Figure 17:
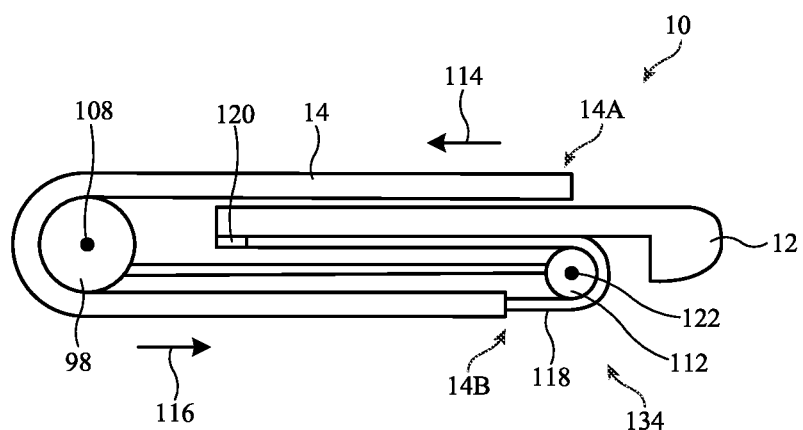
FIG. 17 is a side view of an illustrative display in a retracted state and tensioned using a tensioning member in accordance with an embodiment.

As display 14 moves from the expanded state of FIG. 16 to the retracted state of FIG. 17, housing 12 pushes support structure 120 in direction 114, which in turn causes material 118 to pull end 14B of display 14 taut in direction 116 as display 14 rolls around roller 98. This helps avoid any buckling in display 14 when device 10 (e.g., housing 12) closes into the retracted position.

Figure 18:
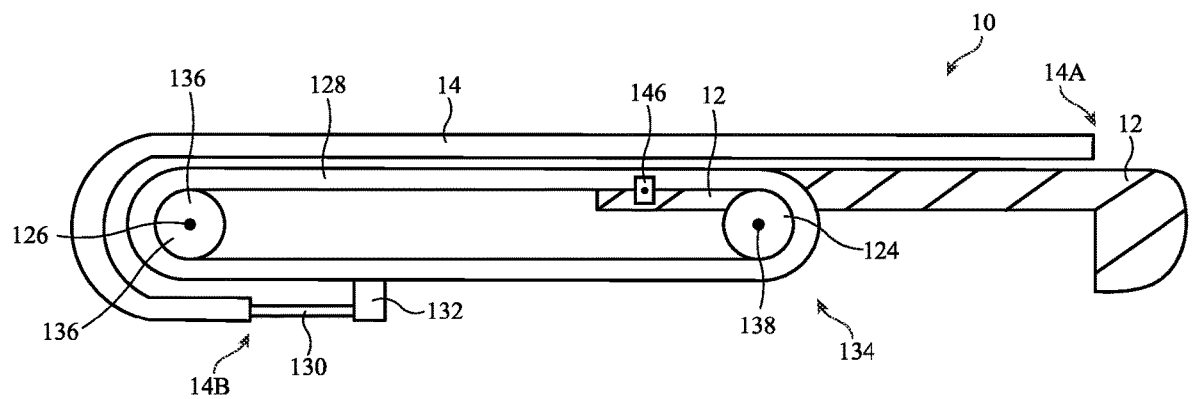
FIG. 18 is a side view of an illustrative display in an expanded state and tensioned using a timing belt mechanism in accordance with an embodiment.

In the example of FIG. 18, display 14 is in the expanded state and tensioning member 134 includes a timing belt mechanism with a toothed belt such as toothed belt 128. Belt 128 may be a mechanical drive belt with teeth molded or otherwise formed on the inner surface of belt 128. Belt 128 may loop around first and second pulleys such as pulley 136 and pulley 124. Pulleys 136 and 124 may have corresponding teeth that engage with the teeth on belt 128. Pulleys 136 and 124 may be configured to rotate about respective rotational axes 126 and 138. Belt 128 may be coupled to housing 12 via a rigid structure such as rigid attachment structure 146. Movement of belt 128 may be coupled to movement of display 14 via coupling structures 130 and 132. Coupling structure 130 may be coupled to end 14B of display 14. Coupling structure 132 may be coupled between coupling structure 130 and belt 128.

Figure 19:
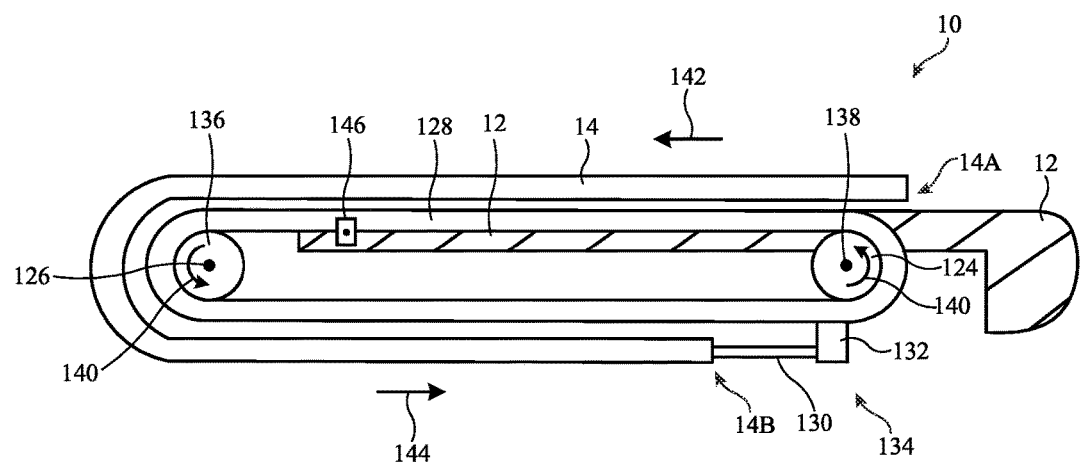
FIG. 19 is a side view of an illustrative display in a retracted state and tensioned using a timing belt mechanism in accordance with an embodiment.

As device 10 moves from the expanded state of FIG. 18 to the retracted state of FIG. 19, housing 12 may push attachment structure 146 in direction 142, which causes belt 128 to rotate in direction 140 about pulleys 136 and 124. Rotation of belt 128 in direction 140 pushes coupling structures 132 and 130 in direction 144, which in turn pulls end 14B of display 14 taut in direction 144 during retraction. This helps avoid any display buckling as device 10 (e.g., housing 12) closes into the retracted position.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
   a housing;
   a display coupled to the housing that is operable in an expanded state and a retracted state, wherein the display has an exposed portion that is viewable in both the expanded and retracted states and a retractable portion that is viewable in the expanded state and is retracted within the housing in the retracted state;
   a frame supporting the display, wherein the frame comprises a rigid portion that supports the exposed portion of the display and a segmented portion that supports the retractable portion of the display; and
   guide rails that are mounted in respective openings in the frame, wherein the guide rails are configured to slide within the openings and the segmented portion is configured to slide relative to the guide rails as the display moves from the retracted state to the expanded state.

2. The electronic device defined in claim 1 wherein the retractable portion is located behind the exposed portion when the display is in the retracted state and is configured to roll around an axis as the display transitions between the expanded and retracted states.

3. The electronic device defined in claim 2 wherein the segmented portion comprises frame segments that extend parallel to the axis.

4. The electronic device defined in claim 3 wherein the frame segments comprise interlocking engagement features that mate with each other and form a solid rigid surface when the frame segments lie in a common plane.

5. The electronic device defined in claim 3 wherein the frame segments slide along the guide rails in a first direction as the display transitions between the expanded and retracted states and wherein the guide rails comprise recesses that mate with corresponding protrusions in the frame segments to constrain movement of the frame and the display in a second direction that is perpendicular to the first direction.

6. The electronic device defined in claim 1 wherein the display comprises first and second opposing ends, wherein the first end is fixed to the housing and the second end is tensioned by a tensioning structure.

7. The electronic device defined in claim 6 wherein the tensioning structure comprises a tensioning bar having a first end coupled to the segmented portion of the frame and a second end coupled to the housing, wherein the tensioning bar is configured to rotate about an axis as the display transitions between the expanded and retracted states.

8. The electronic device defined in claim 1 further comprising first and second rack-and-gear mechanisms configured to move the display between the expanded and retracted states, wherein the first and second rack-and-gear mechanisms are located on opposing edges of the display and are joined by a common drive shaft.

9. The electronic device defined in claim 8 wherein each of the first and second rack-and-gear mechanisms comprises an upper rack, a lower rack, an upper gear, and a lower gear, wherein the upper gear drives the upper rack and the lower gear, and wherein the lower gear drives the lower rack.

10. The electronic device defined in claim 1 wherein the exposed portion and the retractable portion lie in a common plane when the display is in the expanded state.

11. An electronic device, comprising:
    a housing operable in expanded and retracted states;
    a flexible display coupled to the housing, wherein a viewable area of the flexible display increases when the housing transitions from the retracted state to the expanded state;
    a frame that supports the flexible display, wherein the frame has a rigid portion and a flexible portion, wherein the flexible portion is located behind the rigid portion when the housing is in the retracted state and is coplanar with the rigid portion when the housing is in the expanded state; and
    a tensioning bar configured to apply tension to the flexible display as the housing transitions from the expanded state to the retracted state, wherein the tensioning bar has first and second opposing ends separated by a fixed distance, and wherein the first end has a slot and is coupled to the frame via a pin that slides within the slot.

12. The electronic device defined in claim 11 wherein the flexible portion of the frame comprises parallel strips of metal that are movable relative to one another.

13. The electronic device defined in claim 12 further comprising guide rails mounted within guide rail openings in the frame, wherein the rigid portion of the frame comprises solid metal without openings in regions between the guide rail openings.

14. The electronic device defined in claim 11 further comprising an additional tensioning bar configured to apply tension to the flexible display as the housing transitions from the expanded state to the retracted state.

15. The electronic device defined in claim 11 further comprising first and second rack-and-gear mechanisms configured to move the housing between the expanded and retracted states, wherein the first and second rack-and-gear mechanisms are aligned with respective first and second edges of the flexible display, and wherein the first and second rack-and-gear mechanisms are coupled by a common drive shaft.

16. The electronic device defined in claim 11 wherein the flexible display has an exposed portion and a retractable portion, the electronic device further comprising:
   a magnetic roller that rotates about a roll axis, wherein the retractable portion of the flexible display is configured to roll around the roll axis from a retracted position that is behind the exposed portion to a viewable position that is coplanar with the exposed portion, and wherein the frame comprises a metal frame that is magnetically attracted to the magnetic roller.

17. The electronic device defined in claim 16 further comprising magnetic strips in the housing, wherein the magnetic strips are interposed between the retractable portion and the exposed portion when the flexible display is in the retracted position, and wherein the metal frame is magnetically attracted to the magnetic strips.

18. The electronic device defined in claim 16 further comprising a tensioning member coupled to the retractable portion of the flexible display, wherein the tensioning member is configured to apply tension to the flexible display, and wherein the tensioning member is selected from the group consisting of: a layer of fabric, a wire, and a timing belt.

19. An electronic device, comprising:
   a housing;
   an expandable display coupled to the housing, wherein the expandable display has an exposed portion and a retractable portion, wherein the retractable portion is configured to roll around a roll axis from a retracted position that is behind the exposed portion to a viewable position that is coplanar with the exposed portion, and wherein the expandable display has upper and lower edges that extend perpendicular to the roll axis;
   a metal frame that supports the expandable display, wherein the metal frame has a first portion formed from solid metal that supports the exposed portion of the expandable display and a second portion formed from parallel metal strips that supports the retractable portion of the expandable display; and
   first and second rack-and-gear mechanisms respectively aligned with the upper and lower edges of the expandable display and coupled by a common drive shaft, wherein each of the first and second rack-and-gear mechanisms comprises first and second racks and first and second gears, wherein the first gear drives the first rack and the second gear, and wherein the second gear drives the second rack.

20. The electronic device defined in claim 19 wherein the second portion of the metal frame has first and second opposing ends, wherein the first end is coupled to the first portion of the metal frame, and the second end is coupled to a tensioning structure.

21. The electronic device defined in claim 20 wherein the tensioning structure is configured to rotate about an additional axis that is perpendicular to the roll axis as the retractable portion rolls around the roll axis.

* * * * *